United States Patent [19]

Jahns et al.

[11] 4,111,258

[45] Sep. 5, 1978

[54] SPLIT AIR CONVECTION PILE

[75] Inventors: Hans O. Jahns; Joseph W. Galate; John A. Wheeler, Jr., all of Houston, Tex.

[73] Assignee: Exxon Production Research Company, Houston, Tex.

[21] Appl. No.: 684,828

[22] Filed: May 10, 1976

[51] Int. Cl.² .................... F28D 7/12; F28C 3/00; F28F 13/08
[52] U.S. Cl. ........................ 165/40; 62/260; 165/142; 165/45; 405/130
[58] Field of Search .................. 165/45, 142, 145; 62/260; 61/36 A

[56] References Cited

U.S. PATENT DOCUMENTS

| | | | |
|---|---|---|---|
| 749,247 | 1/1904 | Whitaker | 165/142 |
| 1,835,323 | 12/1931 | Olson et al. | 165/142 X |
| 2,932,313 | 4/1960 | Noland | 165/142 X |
| 3,220,470 | 11/1965 | Balch | 165/45 X |
| 3,452,813 | 7/1969 | Watkins et al. | 165/120 |
| 3,732,918 | 5/1973 | Culbertson | 165/45 X |
| 3,823,769 | 7/1974 | Anderson et al. | 165/45 X |
| 3,828,845 | 8/1974 | Waters | 165/45 |
| 3,859,800 | 1/1975 | Wuelpern | 165/45 X |
| 3,935,900 | 2/1976 | Waters | 165/45 |

*Primary Examiner*—Charles J. Myhre
*Assistant Examiner*—Ira S. Lazarus
*Attorney, Agent, or Firm*—Michael E. Nametz

[57] ABSTRACT

An air convection pile for transferring heat from a medium surrounding the lower end of the pile is disclosed to the colder ambient air. A pipe of sufficient length to extend from the air-medium interface downward into the medium is adapted to be opened to the ambient air near its upper end. A flow dividing partition is placed longitudinally within the pipe. The partition has two longitudinal edges which contact the inner wall of the pipe to divide the interior volume of the pipe into two flow channels. The partition is adapted near the lower end of the pipe to allow the flow of air between the flow channels. Apparatus for controlling the flow of air through the pile is also disclosed. A hood encloses the open upper end of the pile. It is adapted to allow the flow of air between the ambient air and the flow channels. Within the hood, there is a temperature responsive, or manual, means for closing off the flow channels from the ambient air.

13 Claims, 7 Drawing Figures

SPLIT AIR CONVECTION PILE

BACKGROUND OF THE INVENTION

1. Field of the Invention

The present invention pertains to an air convection pile for refrigerating a medium into which the pile is disposed by removing heat through convection from the medium to the colder ambient air.

2. Description of the Prior Art

Current developments in oil and gas pipelining and offshore drilling in the arctic region have brought to light several problems where refrigeration of permafrost and bodies of water is desirable. Natural convection of the heat to the arctic air is among several effective methods likely to be used to efficiently solve such refrigeration problems.

It has been found that settling problems are extremely severe in ice rich permafrost, even when active heat sources are isolated from the ground surface by construction on pile supports and gravel pads. In such situations, additional permafrost protection is necessary to prevent progressive thawing of the ice rich soils. Passive regrigeration techniques, including air convection, can be used to remove heat from the permafrost to the colder winter air. As long as the permafrost can be kept frozen through the seasonal changes, settling will not occur.

Air convection refrigeration can also be used in the building of ice islands by placing air convection piles in a body of water to freeze the surrounding water. These islands can be used as protective barriers against moving ice sheets or used to ground massive free floating ice formations. It is even possible to use ice islands as direct support for oil and gas drilling operations or to assist in building temporary artificial islands from which to drill wells.

Air convection piles are known to be effective passive refrigeration devices. A concentric tube air convection pile was disclosed in French Pat. 475,226, issued in 1915. The major technical drawbacks of the concentric tube air convection pile reside in its geometry.

Designing an economic and reliable pile hood with an automatic, or manual, close-off system for a concentric tube convection pile is difficult. It is desirable to seal the interior volume of any convection pile from the ambient air when the air is warmer than the refrigerated medium adjacent the convection pile. Without such a mechanism, winds can force a flow of warm air through the pile, warming the refrigerated medium.

Additionally, maintaining an acceptable rate of heat removal for a convection pile requires some minimum rate of air flow through the pile. The rate of air flow through a pile basically depends on two factors. First, the flow rate will increase as the temperature difference between the air and the medium surrounding the pile increases. Second, the flow rate will be decreased by the frictional resistance to air flow posed by a pile's flow channels. A good relative indicator of a pile's air flow frictional resistance is its wetted perimeter. The wetted perimeter of a convection pile is calculated from its cross sectional geometry and is the sum of the perimeters of all walls which the air contacts as it moves through the flow channels. The smaller a convection pile's wetted perimeter is, in relation to the cross-sectional area of its flow channels, the smaller the internal friction forces resisting the air flow therethrough will be. Therefore, everything else being equal, the less resistance a pile poses to the flow of air therethrough, the longer that pile can be and still maintain some minimum rate of air flow to thereby achieve the same acceptable rate of heat removal. The geometry of the concentric tube air convection pile has a very large wetted perimeter in relation to the area of its flow channels.

Another serious drawback of the concentric tube convection pile is its annular flow channel's susceptibility to plugging by ice rings. During the summer months, moisture will condense on the inside surface of the upper end of a pile which is exposed to the ambient air. This condensate runs down the inner wall until it is frozen by the medium surrounding the pile. An ice ring forms at that point. Convective circulation can probably dissipate such an ice ring by sublimation within a relatively short time, possibly just a matter of weeks; but if an ice ring blocks or restricts the annular flow channel, so that no circulation can take place, then sublimation of the ice ring can take possibly months and maybe even seasons or years. There, therefore, exists a need for air convection apparatus to alleviate the foregoing problems.

SUMMARY OF THE INVENTION

The present invention alleviates the problems outlined above. The simple geometry of the present invention has economic advantages over previous systems and can be seen to facilitate the design and manufacture of economical and reliable close-off devices. At the same time, its design offers the technically desirable advantage of minimizing the wetted perimeter of the flow channels. The smaller a convection pile's wetted perimeter is, in relation to the cross sectional area of its flow channels, the smaller the internal friction forces resisting the air flow therethrough will be. The result is an increase in air circulation through the pile for a given driving force. Therefore, the convection pile of the present invention can be much longer than a concentric tube convection pile of the same diameter and still present the same resistance to air flow. Everything else being equal, the rate of heat removal is proportional to the rate of air flow through the pile.

Additionally, in the present invention, an ice ring the width of the pile radius would be required to block a flow channel. In contrast, a much smaller ice ring will plug the annular flow channel of a concentric tube convection pile.

Briefly, the apparatus of the present invention comprises a pipe extending downwardly within a medium. The top end of the pipe is open to the colder ambient air. A flow dividing partition is longitudinally disposed within the pipe. This partition divides the interior volume of the pipe into at least two flow channels. Near the lower end, it is adapted to allow communication between the flow channels. When the ambient air is colder than the medium the pile is disposed within, natural convection will cause air to flow up one channel and down another transferring heat from the hotter medium surrounding the lower end of the pile to the colder ambient air.

Additionally, a novel air convection pile hood with temperature responsive means to close off the flow channels from the ambient air is disclosed. The close off means prevent a forced circulation of air when the air is warmer than medium surrounding the lower end of the pile. The close off means will gradually open in response to the temperature of the ambient air.

The present invention facilitates the transfer of heat by convection from one medium to the colder ambient air with a geometric cross section minimizing the wetted perimeter of the flow channels and facilitating the design of economical and effective close-off devices. The apparatus of the present invention will therefore be seen to offer significant advantages over systems existing heretofor.

DESCRIPTION OF THE INVENTION

Figure 1:
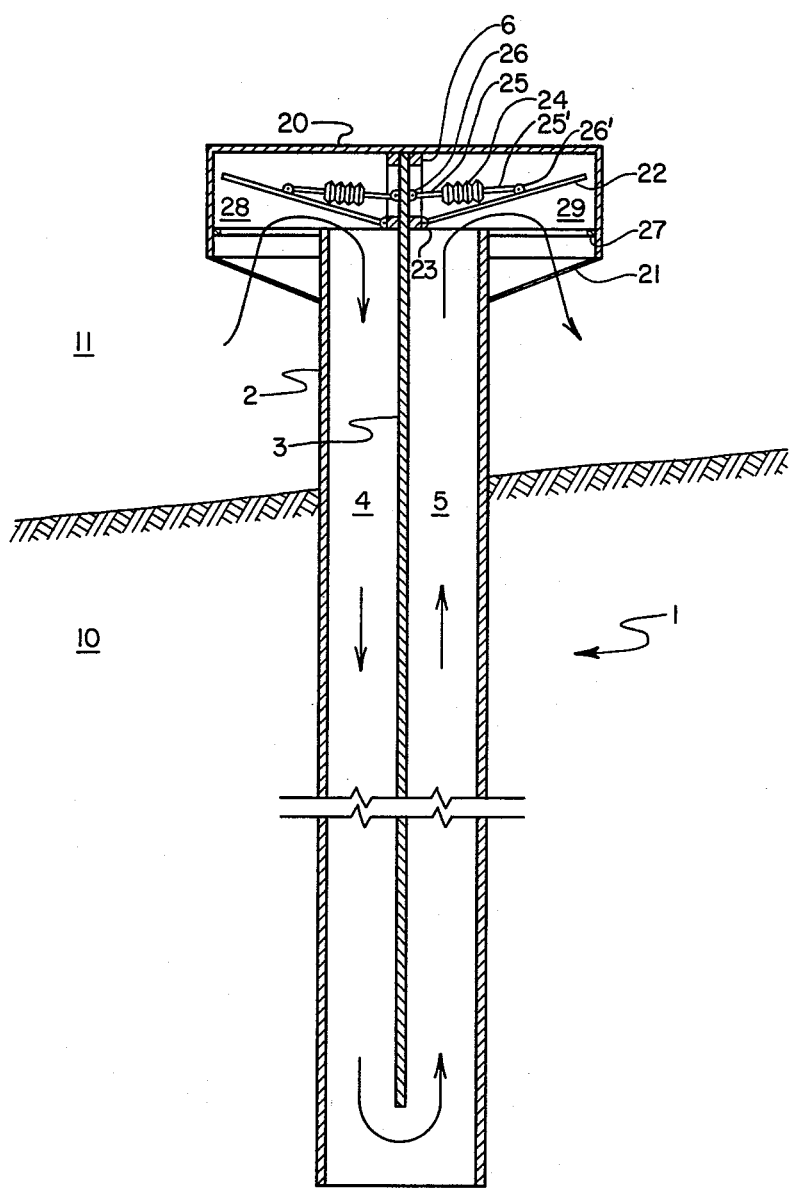
FIG. 1 is an elevation view, in partial section, of the convection pile of the present invention including a hood and automatic closeoff system.

A preferred embodiment of the air convection pile 1 of the present invention is depicted in FIG. 1. The basic elements are the pipe 2 and the partition 3. The lower portion of the pipe is shown disposed within the soil 10. The pipe is divided by partition 3 into two flow channels, 4 and 5. The partition is adapted near its lower end to allow free communication between the channels. The width of the partition is sized to fit snugly against the inner wall of the pipe to isolate the flow channels from each other. An air-tight seal between the partition and inner wall is not necessary. As long as any gaps are kept to a reasonable minimum, the performance of a split air convection pile will not be appreciably changed.

The pipe should certainly be a good conductor of heat to promote the flow of heat from the soil to the air in the flow channels. The pipe could be constructed of any suitable material, preferably having a thermal conductivity greater than 1 BTU/hour-foot-° F.

The objective to keep in mind when selecting the material of construction for the partition is to minimize the heat transferring from the outlet air to the inlet air through the partition since such heat transfer reduces the pile's overall rate of heat removal. The rate of heat removal is dependent on the temperature difference between the air in the pile and the soil. As the inlet air temperature approaches the soil temperature, the temperature difference necessarily decreases and, therefore, the rate of heat removal also decreases. With shorter convection piles, the low thermal conductivity of air and the velocity with which the air flows through the pile will result in at most a negligible horizontal flow of heat between the channels. In such a case, the efficiency of the convection pile is independent of the thermal properties of the partition and the partition can be constructed of any desired material including wood, plastic, corrugated fiberglass and sheet metal. If, instead, the convection pile is of sufficient length, such that significant heat transfer through the partition can occur, the partition should be constructed of a material which inhibits the exchange of heat between the flow channels. Suitable material for construction of an insulating partition would include fiberglass, polypropylene or any other suitable material preferably having a thermal conductivity less than 1 BTU/hour-foot-° F.

The weight of the partition not supported by its snug fit against the inner wall of the pipe will be supported by the support frame 6 which is rigidly affixed to the partition and rests upon the upper rim of the pipe. The support frame, assisted by support rods 21, support the pile hood 20. The pile hood is divided into two isolated chambers 28 and 29 by the partition. Each chamber communicates with one flow channel and vents to the atmosphere 11 through the open lower end of the pile hood. The primary function of the pile hood is to cover the open end of the pipe to minimize the entrance of rain, snow and dirt into the pipe.

In addition, the preferred embodiment of the pile hood depicted in FIG. 1, contains an automatic close-off system. Within the pile hood, there are two flaps 22. The flaps are attached to the support frame 6 by, and pivot about, hinges 23. The position of the flaps is controlled by the temperature-sensitive bellows 24 which expand and contract in response to the temperature of the air 11. Bellows for this application are commercially available from several companies including Flexonics Division of Universal Oil Products. Each bellows connects to the partition and to a flap by connecting rods 25 and 25' and hinges 26 and 26'. It is preferred that the pile hood be a good thermal conductor, i.e. fabricated from materials having high thermal conductivities. This facilitates the equalization of the chamber temperature and the temperature of the surrounding ambient air so that the bellows open the flaps when the air temperature is low enough to remove heat from the soil 10. In FIG. 1, both flaps are shown in the open position allowing free communication between the atmosphere and the flow channels via the hood chambers.

FIG. 1 depicts a split air convection pile disposed within the ground as it would be used in arctic regions to refrigerate the permafrost to avoid the severe settling problems due to thawing. In another application of this invention, split piles are disposed within a body of water. As the piles remove heat from the surrounding water, the water will freeze forming an ice island. Ice islands can facilitate offshore arctic work as direct support for equipment or as barriers preventing damage to vital offshore structures by grounding approaching ice formations.

Figure 2:
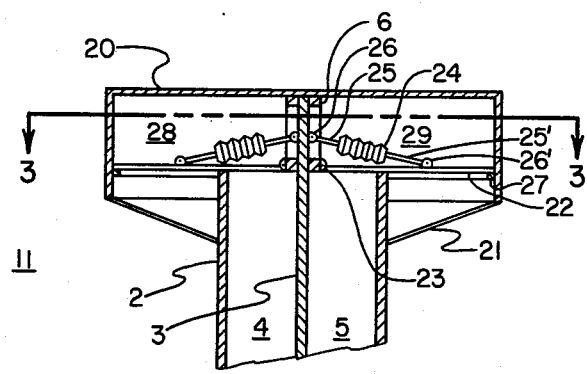
FIG. 2 is an elevation view, in partial section, of the top portion of the pile shown in FIG. 1 with the flow channels closed off from the ambient air by the automatic close-off system.

FIG. 2 is a cross-section of the upper portion of the air convection pile 1 and the pile hood 20 with the flaps 22 depicted in the closed position. As can be seen, bellows 24 are expanded. The lower side of the flaps 22 contacts the upper rim of the pipe 2 and the flap stop 27 which runs circumferentially around the inside of the pile hood. This effectively seals flow channels 4 and 5 from the atmosphere 11. While the temperature sensitive bellows 24 are used to automatically seal the pile hood in this embodiment, it is appreciated that other automatic systems, including bimetallic flaps, can be effectively used. If electrical or hydraulic power is available, the possibilities for automatic close-off actuation would be substantially increased. It is also appreciated that flaps 22 can be manually opened and closed, providing some method of propping, or locking, the flaps open is incorporated in the mechanism.

Figure 3:
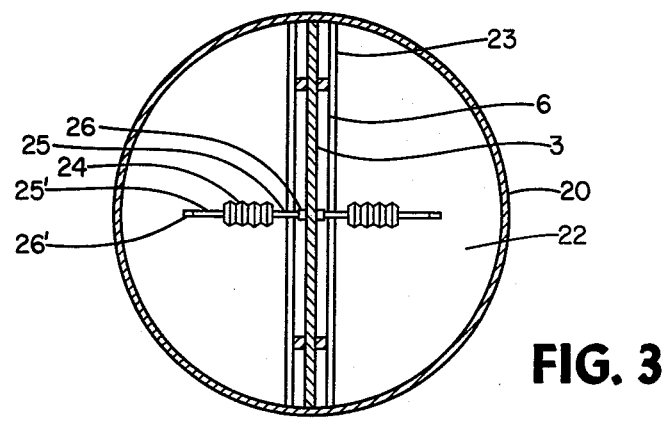
FIG. 3 is a cross section taken along line 3—3 of FIG. 2.

FIG. 3 is a cross section taken along line 3—3 in FIG. 2. As depicted in this top view, the partition 3 divides the pile hood 20 into two separate chambers. Within the chambers, there are flaps 22 which pivot about hinges 23. The temperature sensitive bellows 24 connect with the partition and flaps by connecting rods 25 and 25' and hinges 26 and 26'. The support frame 6, which is rigidly attached to the partition, supports the partition and the pile hood. While the illustrated pile hood is circular, it is appreciated that many other geometric shapes would work just as effectively.

Figure 4:
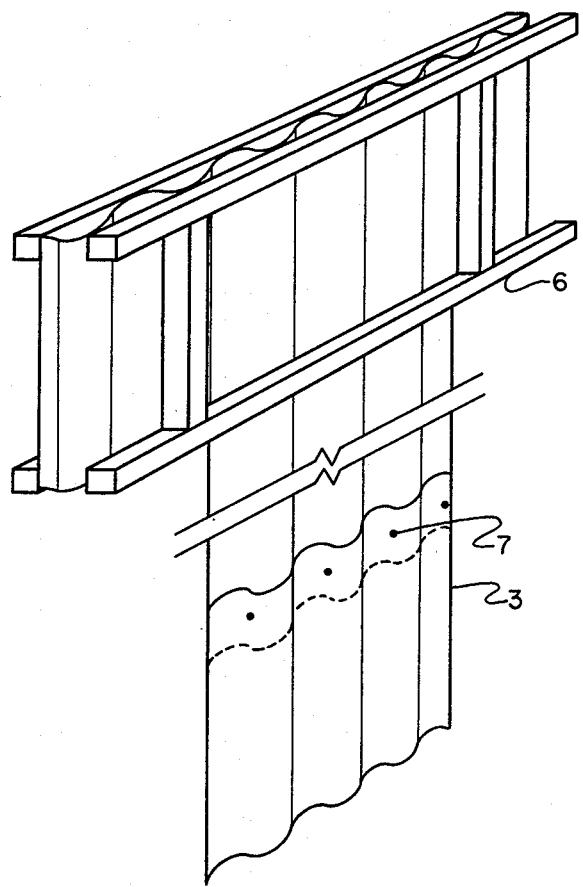
FIG. 4 is a perspective view of a corrugated partition and support frame.

FIG. 4 is a perspective view of a partition 3, constructed of corrugated fiberglass, and a support frame 6. It is quite acceptable to merely overlap and join several partitions to achieve a desired length. The two sections of fiberglass partition depicted in FIG. 4 are joined with several small bolts 7. The support frame is bolted to the partition. It is appreciated that other methods of rigidly attaching the two could be used. The weight of the partition 3, not carried by its snug fit within the pipe, is borne by the support frame which sits upon the upper rim of the pipe. The pile hood sits atop and is conveniently supported by the support frame. The hood is held in position by support rods as shown in FIGS. 1 and 2. The ends of the partition contact the inner surface of the pile hood and thereby effectively seal the head chambers from each other.

Figure 5:
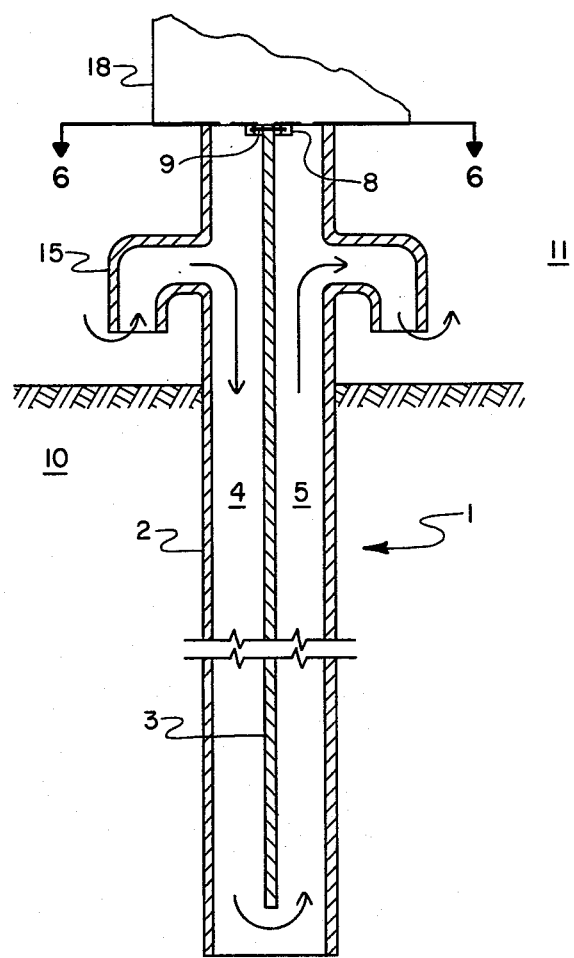
FIG. 5 is an elevation view, in section, of a convection pile of the present invention with another embodiment of a pile hood.

Depicted in FIG. 5 is another embodiment of the present invention. A load, schematically depicted in FIG. 5 and denoted by number 18 for reference, sits on top of the air convention pile 1 and is supported thereby. The load 18 could be any of a number of items including a building, a tower or a pipeline. The load 18 seals off the top end of the pipe 2. Communication from the flow channels to the ambient air 11 is provided by elbow vents 15 which are aimed downward to minimize the undesirable entrance of rain, snow and dirt into the pile. These can be installed by cutting holes in the wall of the pipe and welding the elbows over the holes. The partition 3 is supported near its upper end which butts against the bottom of load 18. This prevents any flow of air between the channels at the upper end of the pile.

Figure 6:
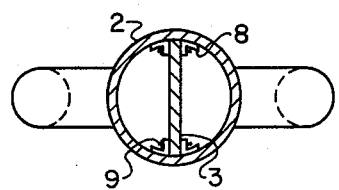
FIG. 6 is a cross section taken along line 6—6 in FIG. 5.

The means of supporting the partition is more clearly shown in FIG. 6 which is a cross section taken along line 6—6 of FIG. 5. Angle iron brackets 8 are welded to the inside surface of the pipe 2. The partition 3 is installed with each edge between two brackets. A bolt 9 extends through two brackets and the partition to carry the weight of the partition not borne by its snug fit within the pipe. It is appreciated that there are many other methods of supporting the partition.

As previously noted, it is preferred to use some type of closeoff mechanism to prevent a forced circulation of air when the ambient air is warmer than the medium in which the convection pile is disposed. The circulation of that warm air would tend to transfer heat into the medium, the opposite of what is desired. Wind is the primary cause of such forced circulation. A close-off mechanism, which seals the interior of the pile from the atmosphere, will eliminate this problem. As shown in FIG. 2, the automatic close-off mechanism disclosed herein will prevent wind induced forced air circulation when the bellows 24 are sufficiently expanded to close the flaps 22.

As the air around the pile hood cools, so too will the air within the hood chambers. When the air is sufficiently cold, the bellows will contract opening the flaps 22, as depicted in FIG. 1. If the medium surrounding the lower portion of the convection pile is still colder than the air, no convective circulation will occur. As soon as the air temperature drops below the temperature of the medium, convection will cause the colder air, being more dense, to enter the pile and descend within the flow channels. At the same time, convection will cause the less dense warm air to rise. Although it may be expected that the cold air would be descending and the warm air rising within each flow channel, it has been found that in one flow channel the air will only be descending and in the other the air will only be rising. A circulation flow of this pattern always developed during experimental testing. The direction of the circulation flow defies accurate analytical prediction, but due to the symmetry of the split pile, the direction of flow is irrelevant. It is also irrelevant to pile performance if the flow direction changes from time to time, but in the experiments, once a circulation flow in one direction began, it continued unaltered.

An air convection pile as depicted in FIG. 1, without an automatic close-off mechanism in the pile hood, was experimentally tested. A pipe, approximately ten feet six inches long and eighteen inches in diameter, was placed in a twenty-four inch diameter pipe. The annulus was filled with water to create a bath surrounding the inner pipe. The twenty-four inch pipe was encased in insulation six inches thick so that any change in the water bath temperature would be attributable to the air convection pile's performance. A partition of corrugated fiberglass, as shown in FIG. 4, extended downward within the inner pipe to about 8 inches from the pipe's lower end. A pile hood, as shown in FIG. 1, was mounted atop the pipe. To measure air temperature, thermocouples were placed within the flow channels at distances from the bottom of the inner pipe of 8 inches, 16 inches, 32 inches, 48 inches, 72 inches, 96 inches and 122 inches. Additionally, thermocouples were placed within the pile hood and surrounding it. The temperature of the water bath was measured by 3 thermocouples placed above the bottom of the inner pipe at distances of 12 inches, 54 inches and 96 inches. The upper end of the pile was enclosed within a large freezer box wherein the air was continuously cooled.

Prior to the start-up of the test, the temperatures of the water bath and the air within the freezer box and within the convection pile were in equilibrium at approximately 70° F. The experiment was begun by turning on a refrigeration unit to cool the air in the freezer box. The temperatures measured by the thermocouples were monitored and recorded hourly.

Figure 7:
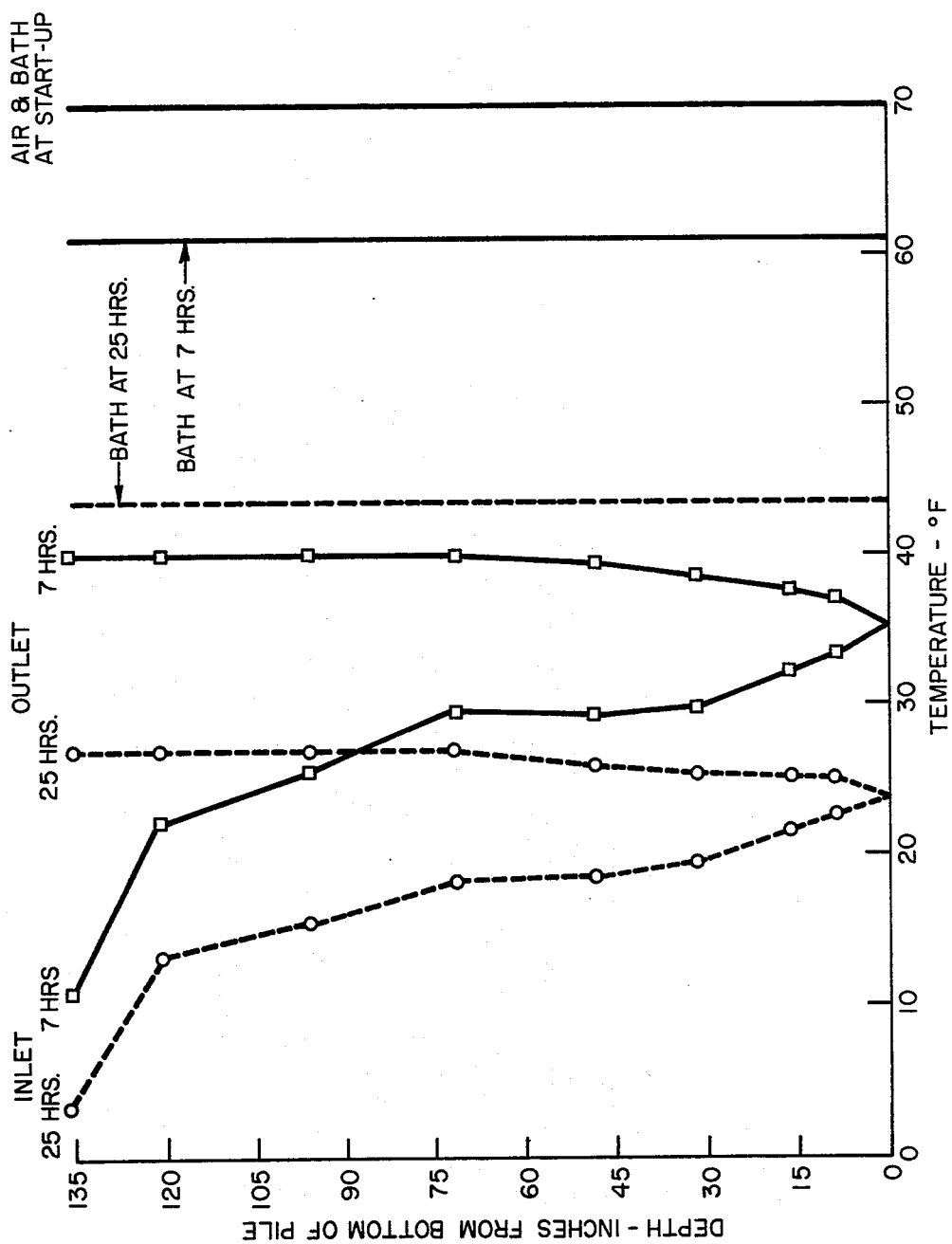
FIG. 7 is a temperature profile plot.

FIG. 7 is a plot of the temperature profiles within the air convection pile and the water bath at start-up, after 7 hours and after 25 hours. The temperatures measured by the thermocouples are plotted against the distance from the bottom of the air convection pile where each thermocouple was located. Since the system was in equilibrium at start-up, all thermocouples measured the same temperature and this is shown by the solid vertical line at 70° F.

The refrigeration unit operated continuously at an approximately constant rate to cool the air within the freezer box. After 7 hours, the temperature of the water bath had dropped about 9° F. and is shown by the solid vertical line at 61° F. Although the temperature of the water bath was measured by three thermocouples at different locations within the bath, the temperature throughout the bath proved to be relatively uniform.

The thermocouples within both channels of the convection pile measured the temperature of the air at their particular locations. The squares are a plot of the thermocouple's location within the pile and the temperatures they measured after 7 hours of the experiment. The solid line interconnecting the squares is an interpolation of the temperatures in the pile between the thermocouples. The temperature profile shows that the air was entering the pile hood from the freezer box at approximately 11° F. The air increased in temperature as it moved down the inlet channel unil it was approximately 35° F. at the bottom of the pile. From there, the air ascended in the outlet channel being heated to about 40° F. by the time it left the pile hood.

After 25 hours, the bath temperature had decreased to 44° F. as shown by the dashed vertical-line. The thermocouple locations and their respective measurements of the air temperatures within the pile are plotted with open circles. The interconnecting-line represents the temperatures between the thermocouples. The flow through the convection pile had the same characteristics as after 7 hours. The cold air entered one flow channel and increased in temperature as it descended. At the bottom of the pile, the air moved into the other flow channel and was heated as it ascended. Heat was continuously moving from the water bath to the colder air in the pile which was convectionally circulated to the freezer box where the refrigeration unit cooled the heated air.

Several general observations can be made. First, a definite flow of air down one channel and up the other was established and maintained throughout the experiment. The temperature profiles demonstrate this. Also, the water bath and pile were warmer than the air in the pile or freezer box, so that the longer the colder air was exposed to the warmer walls of the pile, the more its temperature must have increased. The temperature of the air in the inlet channel increased from the top to the bottom of the pile. Therefore, the air must have been descending. On the other hand, the temperature of the air in the outlet channel increased from the bottom of the pile to the top. The air must have been ascending. It necessarily follows that the symmetric channels could not have been acting independently. If they were, the temperature should have been nearly equal at the same location in each channel. Further, there seems to be no other explanation for the top to bottom increase of temperature in one channel while the temperature decreased in the other channel. That is, unless there was a circulation of air down one channel and up the other.

Finally, with time, the temperature of the water bath would approach and equal the temperature of the air in the pile. Note that while the temperature of the water bath dropped about 16° F., the temperature of the air at any point within the convection pile only dropped about an average of 10°–12° F.

Maintaining an acceptable rate of heat removal for a convection pile requires some minimum rate of air flow through the pile. The rate of air flow through a pile basically depends on two factors. First, the flow rate will increase as the temperature difference between the air and the medium surrounding the pile increases. Second, the flow rate will be decreased by the frictional resistance to air flow posed by a pile's flow channels. While the actual air flow and heat transfer functions are very complicated, the wetted perimeter of a channel or a pile, in relation to its bounded cross-sectional area, is a good comparative indicator of a pile's frictional resistance to air flow. The wetted perimeter of a convection pile is calculated from its cross-sectional geometry and is the sum of the perimeters of all walls which the air contacts as it moves through the flow channels.

For purposes of comparison, the following table gives the cross sectional area and wetted perimeter of a concentric tube convection pile and a split air convection pile. The table compares piles 18 inches in diameter with the inner tube of the concentric tube convection pile being 12 inches in diameter. Based on computer analysis and full scale experimentation, the use of a 12 inch diameter inner tube maximizes the rate of heat removal for an 18 inch diameter concentric tube convection pile.

| Pile | Flow Channel | Cross Sectional Area | Wetted Perimeter |
| --- | --- | --- | --- |
| Concentric Tube | Inner | 113 sq. in. | 38 in. |
|  | Annular | 141 sq. in. | 94 in. |
|  | Total for Pile | 254 sq. in. | 132 in. |
| Split-pile | Single Channel | 127 sq. in. | 46 in. |
|  | Total for Pile | 254 sq. in. | 92 in. |

Assuming a constant temperature differential, the greater the wetted perimeter of a pile is, the shorter that pile must be to maintain the same rate of heat removal as a pile with the same cross-sectional area and having a smaller wetted perimeter. The total cross-sectional area of the flow channels of the two piles compared in the table above are equal. Yet, the wetted perimeter of the split pile is only 70 percent of the concentric tube's wetted perimeter. These figures indicate that, per unit length, a split air convection pile offers far less resistance to air flow than a concentric tube convection pile. Therefore, a split air convection pile having the same total resistance to air flow as an equal diameter concentric tube convection pile will be a much longer pile.

The importance of pile length is two fold. First, the longer the pile, the deeper will be the medium surrounding the pile that can be refrigerated. Second, the longer the pile, the greater is the pipe's inner surface area and therefore, more total heat can be removed by a longer pile, all else being equal.

A further operational advantage of the present split air convection pile was evident from experimental testing of various air convection piles. When the air was warmer than the pile, condensate formed on its inner surface. This condensate would run down the pile until the medium surrounding the pile was cold enough to freeze the condensate. At this level in the pile, an ice ring formed. As long as there is some convective flow through an air convection pile, condensate will evaporate and ice rings will sublimate within a short period of time, possibly just a matter of weeks; but if a flow channel is blocked, preventing convective circulation, sublimation or evaporation could take months or longer. The lack of refrigeration for a long period of time could have disastrous results if the medium surrounding the pile becomes too unstable.

The annular flow channel of an 18 inch diameter concentric tube convection pile with a 12 inch diameter inner tube would be completely plugged by a mere 3 inch wide ice ring. An 18 inch diameter split pile convection pile, on the other hand, would not have a flow channel plugged until a 9 inch wide ice ring formed.

The geometry of a split air convection pile offers a cost saving over a concentric tube convection pile, not only in pile hood design and manufacture, but also in the cost of the partition. For equal diameter piles, the inner tube of a concentric tube convection pile requires more material than needed for a split pile's partition. Generally, it is also more expensive to fabricate a tube than a flat partition as used in the split pile.

While the illustrated embodiments depict a convection pile of circular cross section, it is appreciated that it could function effectively with many different geometric cross sections.

What is claimed is:

1. An air convection pile for transferring heat by natural convection to the ambient air from a hotter medium, comprising:
    a. a pipe having an upper end and a lower end, said pipe having a length sufficient to extend from a surface which is exposed to the ambient air to a location within said hotter medium said lower end being disposed within said hotter medium and said upper end being disposed above said surface, said upper end being openable to the ambient air; and
    b. a flow dividing partition disposed longitudinally within said pipe, having two longitudinal edges contacting the inner wall of said pipe to divide the interior volume of said pipe into at least two flow channels, said flow dividing partition being adapted to substantially prevent the flow of air between said flow channels at said upper end of said pipe and along a substantial portion of the length of said pipe and being adapted to permit the flow of air between said flow channels near said lower end of said pipe.

2. The apparatus of claim 1 wherein the upper end of said pipe is adapted to be opened to the ambient air through a hole in the wall of said pipe.

3. The apparatus of claim 2 including an elbow vent to cover said hole in the wall at the upper end of said pipe to substantially reduce the entrance of dirt, rain, and snow into the pile.

4. The apparatus of claim 1 including a hood mounted atop, and enclosing, the upper end of said pipe, said hood being adapted to allow the flow channels to communicate with the ambient air.

5. The apparatus of claim 4 including close-off means located within said hood capable of preventing communication between the flow channels and the ambient air, said close-off means being responsive to the temperature of the ambient air, said close-off means preventing communication between the ambient air and the flow channels when the ambient air is warmer than the medium surrounding the lower end of said pipe and allowing communication as the temperature of the ambient air decreases to a predetermined temperature.

6. The apparatus of claim 5 wherein said close-off means includes a flap pivotally mounted within said hood, said flap adapted to close-off a flow channel from the ambient air when pivoted to a closing off position and means for moving said flap to and from its closing off position, said moving means being responsive to the temperature of the ambient air.

7. The apparatus of claim 6 wherein said moving means includes a temperature sensitive bellows which varies in longitudinal dimension according to its temperature and means for connecting said bellows to said flap to move said flap as said bellows' longitudinal dimension responds to the temperature of the ambient air.

8. The apparatus of claim 4 wherein said partition extends upward within said hood dividing it into chambers, each said chamber communicating with one flow channel and the ambient air.

9. The apparatus of claim 1 wherein said pipe has a thermal conductivity greater than 1 BTU per hour per foot per ° F.

10. The apparatus of claim 1 wherein said partition has a thermal conductivity less than 1 BTU per hour per foot per ° F.

11. Apparatus for controlling the flow of air through the flow channels of a split air convection pile, said air convection pile transferring heat by natural convection, comprising a hood enclosing the upper open end of said air convection pile, said hood being adapted to allow communication between the ambient air and the flow channels within the pile and means located within said hood for closing off the flow channels from the ambient air in response to the temperature of the ambient air, said closing off means preventing communication between the ambient air and the flow channels when the ambient air is warmer than the medium surrounding the lower end of said pipe and opening to allow communication as the temperature of the ambient air decreases to a predetermined temperature.

12. The apparatus of claim 11 wherein said closing off means includes a flap pivotally mounted within said hood, said flap adapted to close off a flow channel from the ambient air when pivoted to its closing off position and means for moving said flap to and from its closing off position, said moving means being responsive to the temperature of the ambient air.

13. The apparatus of claim 12 wherein said moving means includes a temperature sensitive bellows which varies in longitudinal dimension according to its temperature and means for connecting said bellows to said flap as said bellows' longitudinal dimension responds to the temperature of the ambient air.

* * * * *